(12) United States Patent
Chang

(10) Patent No.: US 8,558,820 B2
(45) Date of Patent: Oct. 15, 2013

(54) MOUSE DEVICE WITH FUNCTIONAL TURNTABLE

(75) Inventor: Yuan-Jung Chang, Taipei Hsien (TW)

(73) Assignee: Dexin Corporation, Taipei Hsien (TW)

(*) Notice: Subject to any disclaimer, the term of this patent is extended or adjusted under 35 U.S.C. 154(b) by 299 days.

(21) Appl. No.: 12/916,713

(22) Filed: Nov. 1, 2010

(65) Prior Publication Data

US 2012/0105329 A1     May 3, 2012

(51) Int. Cl.
*G06F 3/033* (2013.01)
(52) U.S. Cl.
USPC ............................................. 345/184; 345/163
(58) Field of Classification Search
USPC ................... 345/157, 184, 163, 167
See application file for complete search history.

(56) References Cited

U.S. PATENT DOCUMENTS 6,788,288 B2 *  9/2004  Ano ............................. 345/157
7,084,856 B2 *  8/2006  Huppi ......................... 345/163

* cited by examiner

*Primary Examiner* — Kevin M Nguyen
(74) *Attorney, Agent, or Firm* — Rosenberg, Klein & Lee

(57) ABSTRACT

Provided is a human interactive interface device having a functional turntable. The interface device includes a housing unit, an interface circuit, a sensor unit, and a control unit. The housing unit has at least a left key, a right key, a mouse wheel, and a turntable. The turntable is disposed around the mouse wheel. The interface circuit is connected electrically to the turntable for generating a dial signal in accordance to a dial position of the turntable. The senor unit is located on the lower surface of the housing, and captures an image signal according to a reflex formed on a contact surface. The control unit is connected electrically to the interface circuit and the sensor unit, and is used for adjusting a coordinate axis positioning angle or a coordinate vector ratio of the sensor unit according to the dial signal, and further calculates a displacement according to the image signal.

14 Claims, 4 Drawing Sheets

MOUSE DEVICE WITH FUNCTIONAL TURNTABLE

BACKGROUND OF THE INVENTION

The present invention relates to a human interactive interface device, in particular, to a mouse device having a functional turntable capable of signaling the associated computer for the execution of various functions.

DESCRIPTION OF RELATED ART

With the advancement and wide accessibility of modern personal computers, the user operating interface has been greatly enhanced by the adaptation of various graphical user interface (GUI). To further accommodate the GUI operating requirements, the mouse device was developed and has now become an essential peripheral device.

A conventional mouse device usually includes a right bottom, a left, and a center wheel, each offers limited operational functions. However, when combined with associated software, a conventional mouse becomes capable of introducing more programmable functions to the limited onboard operating interface. The added functions may allow individual users to define the onboard function keys to fit individual flavor and requirement, thus further enhancing, the operating experience.

Moreover, to some power users, such as those who use computers to process graphics or play games, a mouse having a higher resolution is often demanded. Various specialty computer mice have therefore been developed for those needs. For example, the resolution of a mouse device can be configured on demand.

However, for the user's convenience, the multi-functional mouse may require larger physical size to accommodate the additional function keys, thus negatively affect the operating comfort and convenience. Therefore, there exists a need for an improved multi-functional mouse device.

SUMMARY OF THE INVENTION

In view of the abovementioned drawbacks of the conventional mouse device, the instant disclosure provides a pointing device having a functional turntable for accommodating multiple programmable functions.

In an example of the invention, a turntable is introduced to surrounding the mouse wheel. This turntable is configured to execute the functional parameters of the mouse device according to a turning scale as turning the turntable.

According to one of the embodiments, the mouse device with functional turntable includes a housing unit, an interface circuit, a sensor unit, and a control unit. The housing is disposed with at least one key, a wheel, and a turntable. The turntable particularly surrounds the wheel. The interface circuit is electrically connected to the turntable. A dial signal is generated in response to the turning scale made by the turntable. The sensor unit is disposed at one side of the housing. Further, an opposite displacement is output in response to the housing moving on a contact surface.

The control unit is electrically connected to the interface circuit and the sensor unit. In response to the information of dial signal, the control unit adds configuration of coordinate-axis positioning angle or coordinate vector ratio to the output displacement of the sensor unit.

The instant disclosure is designed so that the functional parameters can be fast reached without any change of operative behavior of mouse device.

These and other various advantages and features of the instant disclosure will become apparent from the following descriptions and claims, in conjunction with the appended drawings.

DESCRIPTION OF THE PREFERRED EMBODIMENTS

One objective of the present invention is to introduce a functional turntable to a human interactive interface device for flexibly enabling additional functional parameters. The turntable allows users to operate the functions more conveniently since the conventional keys may be substituted by a turning mechanism. This turntable can be implemented by any turning means such as, but not limited to, a mechanical-type, an optical-type or a touch-type turntable. The turning motion may generate various signals.

Figure 1:
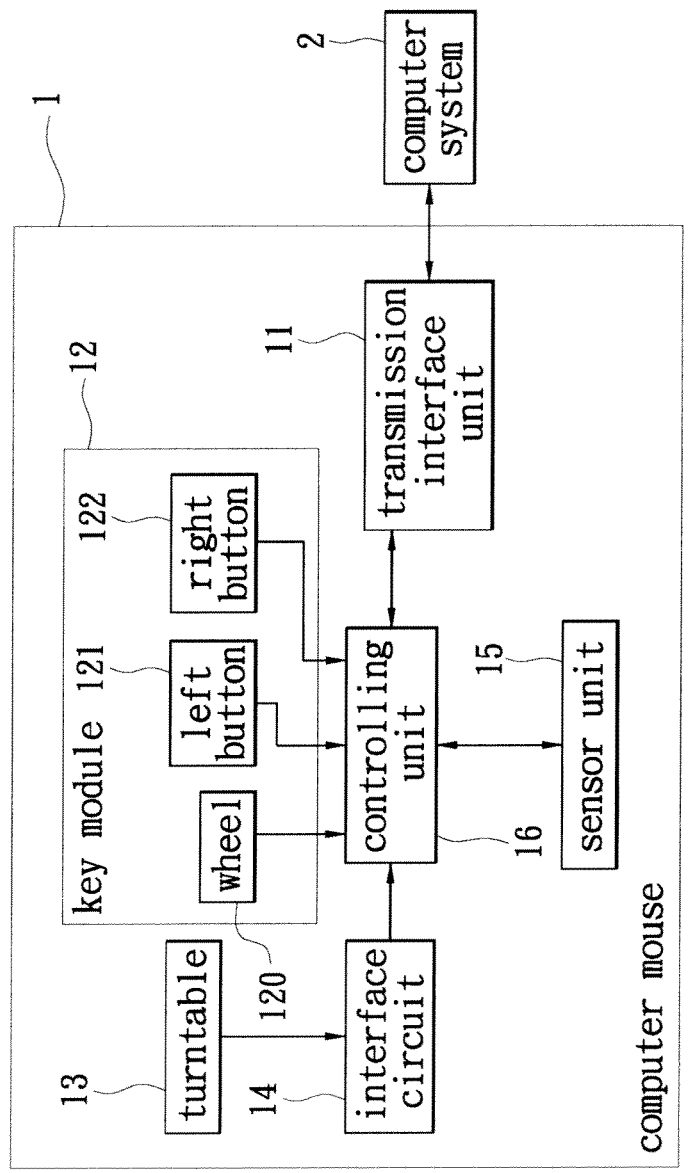
FIG. 1 shows a block diagram of the mouse device with functional turntable in accordance with the embodiment of the instant disclosure.
Figure 2:
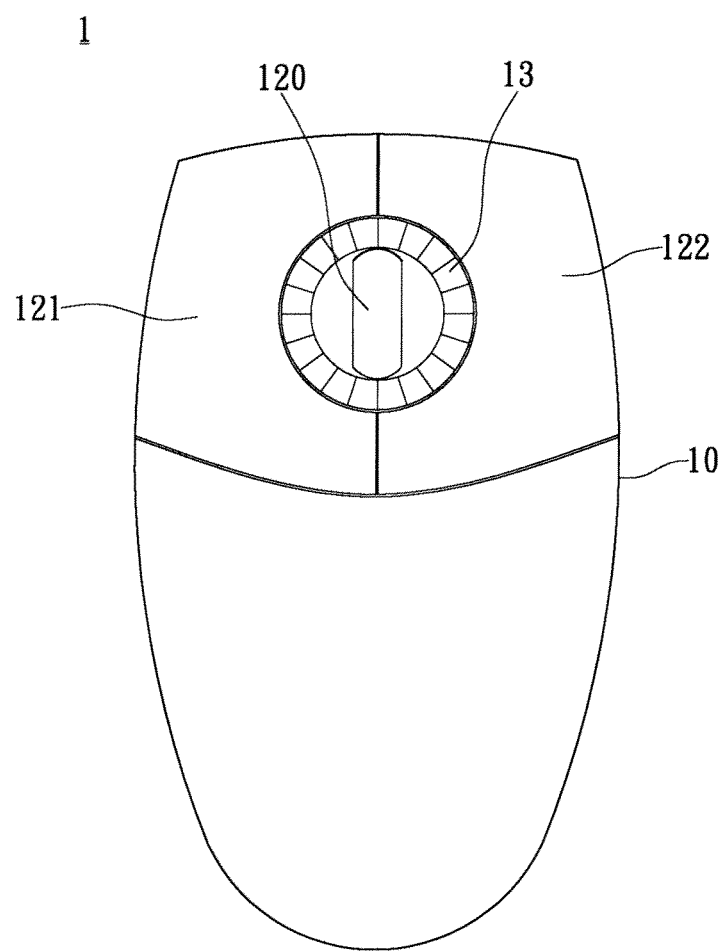
FIG. 2 shows a perspective view illustrating the mouse device with functional turntable in accordance with the embodiment of the instant disclosure.

Reference is made to both FIG. 1 and FIG. 2, which respectively show a block diagram and a perspective view of the pointing device, the mouse device, with functional turntable in accordance with the embodiment of the present invention. Provided is a mouse device 1 with functional turntable applicable to a computer system 2. The mouse device is placed on a contact surface (not shown) for user's operation. The mouse device 1 includes a housing 10, a transmission interface unit 11, a key module 12, a turntable 13, an interface circuit 14, a sensor unit 15 and a control unit 16.

The transmission interface unit 11 is in communication with the computer system 2. According to design, the transmission interface unit 11 is in communication with the computer system 2 via a wire or wireless connection. The transmission interface unit 11 serves as a data transmitting path between the mouse device 1 and the computer system 2.

The key module 12 has at least one wheel 120, a left button 121 and a right button 122. The skilled person in the related art may understand that the wheel 120 and the keys 121, 122 are preferably disposed on the housing 10. The wheel 120 and the keys 121. 122 generally allow the user to perform the operations including forward/backward paging, clicking, and calling shortcut menu. The example may not limit to the description The turntable 13 is disposed on the housing 10 and independent of the mouse device's left button 121, right button 122 and wheel 120. In particular, the turntable 13 in accordance with embodiment has a central perforation. The wheel 120 is particularly disposed at center of the turntable 13, and on the other words, the turntable 13 surrounds the wheel 120 and allows the user's turning operation.

The interface circuit 14 is electrically connected to the turntable 13. In particular, the turntable 13 has a turning scale, and correspondingly generates a dial signal. This turning scale is made by turning the turntable 13 based on the specification of turntable 13. It is noted that the present invention may not be limited to what is indicated by the turning scale.

Sensor unit 15 is disposed on one side of the housing 10, and preferably at the bottom surface of the mouse device. The operation of the sensor unit 15 generally bases on the detection and measurement of the coordinate-axis positioning angle and the coordinate vector ratio of a reflected optical signal. The technology and operating principle of the mouse sensor unit is generally well developed, and thus need not be thoroughly discussed here. However, depending on specific practical needs and operational requirements, the light source of the mouse sensor unit may be laser or infrared, and the detector of the sensor unit (15) is selected in accordance with the corresponding light source.

The control unit 16 is electrically connected to the transmission interface unit 11, the key module 12, the interface circuit 14 and the sensor unit 15. In particular, the control unit 16 is configured to generate a key signal based on the user key operation of the mouse wheel 120, the left key 121, or the right key 122. Furthermore, the control unit 16 is configured to regulate the function performed by the mouse device according to the dial signal. The detail of the dial signal will be discussed in the following sections.

The control unit 16 will transfer the key signal and displacement to the computer system 2 via the transmission interface unit 11. The mouse device 1 accomplishes the various operations of the computer system 2.

The control unit 16 therefore serves to operate a functional parameter of mouse device 1 according to the dial signal generated by the interface circuit 14. The described functional parameters may include the adjustments for the coordinate-axis positioning angles and the coordinate vector ratio, or the programming control for a tilting wheel, a switching profile or a shortcut function for a mouse key. The programmable functional parameters of the mouse device will be further elaborated as follows.

Figure 3:
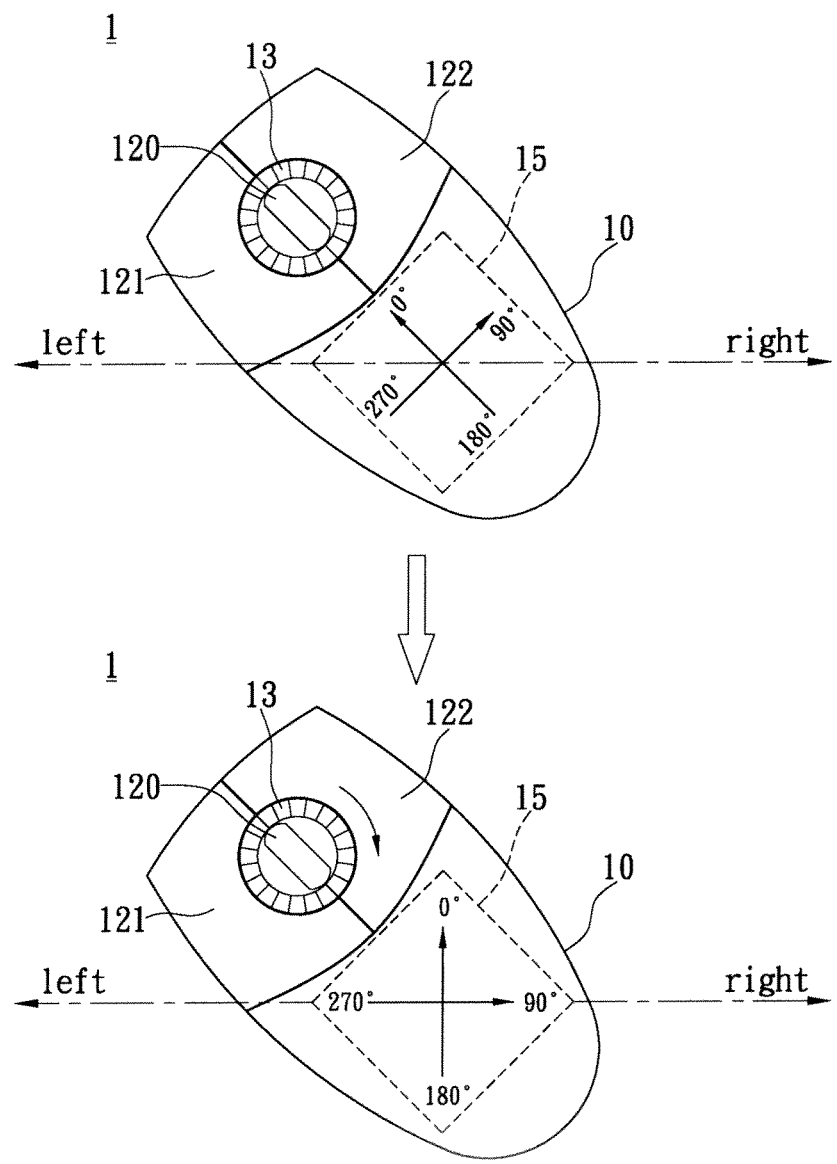
FIG. 3 shows a coordinate-axis positioning angle of the sensor unit in accordance with the embodiment of the instant disclosure.

The functional parameter with respect to the coordinate-axis positioning angle is referred to FIG. 3, which shows a schematic diagram of the configuration of coordinate-axis positioning angle of the sensor unit.

A user may set the mouse device to operate at a tilted condition. For example, FIG. 3 shows the mouse being operated at a tilting angle of 45 degrees. The operating reference frame of the coordinate-axis positioning angle of the sensor unit 15 of the mouse device 1 is adjustable according to the dial setting of the turntable. Thus, since the coordinate-axis positioning angle shifts with respect to the tilting angle of the mouse device 1, the mouse cursor in the computer system 2 will move upper left 45 degrees and lower right 45 degrees if the user moves the mouse device with the used horizontal direction forward and backward.

By means of the dialing function of the turntable 13, the coordinate-axis positioning angle of sensor unit 15 may be adjusted to suit a user's particular habit and need. For example, the user may adjust the turntable 13 by turning the dial clockwise to a certain degree to regulate the positioning angle of the sensor unit 15 of the mouse device 1. In the meantime, the coordinate-axis positioning angle may be finely adjusted to 45 degrees in a clockwise dial setting. The positioning angle of the sensor unit 15 is referred to the lower diagram of FIG. 3. Therefore, the mouse device 1 may be operated normally at a preferred tilting angle. The user therefore manipulates the mouse device 1 at his preferred operating angle.

Figure 4:
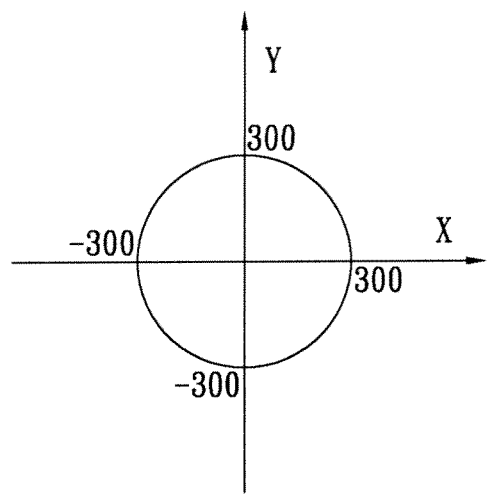
FIG. 4 shows a coordinate vector ratio of the sensor unit in accordance with the embodiment of the instant disclosure.
Figure 4:
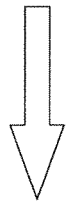
Figure 4:
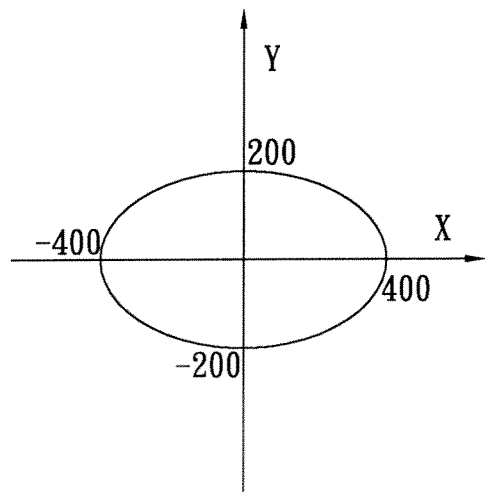

Next, the relevant functional parameters regarding to the coordinate vector ratio is referred to FIG. 4, which shows the coordinate vector ratio of the sensor unit. It is worth noting that to configure the coordinate vector ratio is to regulate the resolution of the mouse device 1. The resolution can be easily understood as the mouse's sensitivity, which is used to calculate a moving distance between the mouse device 1 and the mouse cursor. More specifically, if the default resolution of the mouse device 1 is 400 dpi and the display resolution of the computer system 2 is 1280*1024, the moving distance is around 3.2 inch (about 8 centimeters, 1280/400) if the mouse cursor is moved from a far left to an opposite right on the screen.

The turntable of the instant disclosure is configured to execute the functional parameters to configure the coordinate vector ratio, that is, to regulate the ratio of the coordinates projected on the X-axis and the Y-axis. In particular, the vectors on the X axis and the Y axis may not be proportionally enlarged or shrunk. Thus, the resolution of the X axis increases and the resolution of the Y axis decreases when the turntable 13 is turned clockwise. In contrast, the counterclockwise-turned turntable 13 decreases the resolution of X axis and increases the resolution of Y axis.

In accordance with FIG. 4, the default resolution of mouse device 1 is 600 dpi, and the coordinate vector ratio of sensor unit 15 is 1:1. This ratio shows both the resolutions of X axis and Y axis are 600 dpi. When the turntable 13 is clockwise turned with a certain turning scale, referring to the lower diagram of FIG. 4, the X axis becomes 800 dpi as adding up 200 dpi and the Y axis becomes 400 dpi as it decreases 200 dpi. After that, the ratio becomes 2:1 after the configuration. It is noted that the change of ratio is not limited to integer, but depends on the need.

Furthermore, the functional parameters related to the coordinate vector ratio allow the user to adjust resolution of the mouse device 1 based on the screen resolution of the computer system 2. Therefore, the moving displacement of the mouse device 1 may be in compliance with the required precision for the users when the mouse device 1 is moved up, down or around.

The turntable of the instant disclosure may also be adapted to provide tilting functions of a conventional mouse wheel. With proper software setup, the turntable 13 may be operated clockwise or counterclockwise correspondingly to perform the conventional left/right tilting functions of a conventional mouse wheel. Therefore, the replacement of the traditional tilting mouse wheel with the turntable 13 may reduce the mechanical complexity of a conventional tilting mouse wheel, thus contributing to the reduction of component and manufacture costs.

In regard to the functional parameters profile switching capability, turntable 13 may be used to perform profile switching functions. For example, the keys including wheel 120, left button 121 and right button 122 of the key module 12 of the mouse device 1 may be re-configured or combined for the various functions to suit the operational convenience of different software. This capability can be especially valuable for computer garners who have never-ending needs for custom configuration to suit their particular habits. Serious garners may even find the need for adapting different control profiles within a single game in response to the various game scenes or scenarios. Accordingly, by operating the turntable 13, the mouse device of the instant disclosure may be configured to provide fast and convenient control profile switching capability.

Since the turntable 13 merely has a clockwise turning direction and a counterclockwise direction used for the fast switched functions, the user may easily make his preferred configuration for various controls using the two directions.

In one more embodiment, for the turntable 13 of the mouse device 1 is used to perform the various functional parameters, a switching signal for the control unit 16 will be introduced further. The switching signal is configured to switch a turntable function mode of the turntable 13. Therefore, one corresponding functional parameter is performed according to the current turntable function mode. It is noted that one functional parameter corresponds to the configuration of coordinate-axis positioning angle, the configuration of coordinate vector ratio, the tilting wheel, the switching profile or the shortcut function key. Thus, the invention allows the users to perform any corresponding functional parameter by turning the turntable 13.

In an exemplary embodiment, the control unit 16 can have a built-in lookup table (not shown). This lookup table has variant fields corresponding to the turntable function modes. Each field particularly records the action information regarding the clockwise and counterclockwise turning directions and the turning scales of the turntable 13. Further, the control unit 16 also selects the field related to the turntable function mode according to the switching signal. The dial signal corresponds to the action information of the selected field. The design of turntable 13 is capable of performing the various functional parameters.

It is worth noting that there are at least two ways to generate the mentioned switching signal. One is to design one more switching key (not shown in the diagram) in the key module 12 of the mouse device 1. Therefore, the user may use this switching key to trigger a switching signal. The other one is to introduce software that uses a driver interface (not shown) or any program of the computers system 2 for providing selections for users. The selection may generate a switching signal to perform the parameter. Whatever the design is, the turntable effectively conducts the switching signal for the selection of turntable function mode.

To sum up, a turntable component is particularly introduced into a mouse device. The turntable is featured to perform more functional parameters in addition to the basic functions. The users may perform the functions by smoothly turning the turntable. The turntable, in design, surrounds the conventional wheel of the mouse device. The design may not affect the user's conventional behavior, and further provide fast switching to the functional parameters. As a whole, the invention may not increase much size of the mouse device, but the convenient operation interface. It is noted that the number of keys such as the described left and right buttons is not limited to the present invention.

While the description constitutes the preferred embodiment of the instant disclosure, it should be appreciated that the invention may be modified without departing from the proper scope or fair meaning of the accompanying claims. Various other advantages of the instant disclosure will become apparent to those skilled in the art after having the benefit of studying the foregoing text and drawings taken in conjunction with the following claims.

What is claimed:

1. A mouse device with functional turntable comprised of:
   a housing unit having at least one control key, a mouse wheel, and a functional turntable, the functional turntable disposed around the mouse wheel, wherein the functional turntable is configurable to reach a plurality of dial positions;
   an interface circuit in communication with the functional turntable, wherein the interface circuit generates a dial signal corresponding to the dial position of the functional turntable;
   a sensor unit disposed on the bottom surface of the housing unit, wherein the sensor unit outputs a value of displacement in response to the housing moving on a contact surface;
   a control unit electrically connected to the interface circuit and the sensor unit, the control unit configurable for providing coordinate-axis positioning angle and coordinate vector ratio adjustments corresponsive to the dial signal of the interactive circuit; and
   a transmission interface unit electrically connected to the control unit.

2. The mouse device with functional turntable of claim 1, wherein the control unit is further configurable for receiving a switching signal for switching functions of a functional turntable, and selecting the coordinate-axis positioning angle or the coordinate vector ratio based on the functional turntable.

3. The mouse device with functional turntable of claim 2, wherein the control unit is further configurable for receiving the switching signal triggered by a switching key or the switching signal generated by operation of a computer system in communication with the pointing device.

4. The mouse device with functional turntable of claim 1, wherein the functional turntable is a mechanical-type turntable.

5. The mouse device with functional turntable of claim 1, wherein the functional turntable is an optical-type turntable.

6. The mouse device with functional turntable of claim 1, wherein the functional turntable is a touch-type turntable.

7. A mouse device with functional turntable comprised of:
   a housing unit having at least one control key, a mouse wheel, and a functional turntable, the functional turntable disposed around the mouse wheel, wherein the functional turntable is configurable to reach a plurality of dial positions;
   an interface circuit in communication with the functional turntable, wherein the interface circuit generates a dial signal corresponding to the dial position of the functional turntable;
   a control unit electrically connected to the interface circuit and the sensor unit, the control unit configurable for performing a functional parameter corresponsive to the dial signal of the interactive circuit
   a transmission interface unit electrically connected to the control unit.

8. The mouse device with functional turntable of claim 7, wherein the control unit further configurable for receiving a switching signal for switching a turntable function mode, and selecting to perform functional parameters including a tilting wheel, switching profile, or a shortcut function key based on the turntable function mode.

9. The mouse device with functional turntable of claim 8, further comprising:
   a sensor unit disposed on one surface of the housing unit electrically connected to the control unit, the sensor unit outputting a displacement in response to the housing moving on a contact surface;
   wherein the sensor unit operates basing on a coordinate-axis positioning angle and a coordinate vector ratio.

10. The mouse device with functional turntable of claim 9, wherein the control unit is further configurable for selectively performing adjustment of the coordinate-axis positioning angle or coordinate vector ratio in response to the turntable function mode.

11. The mouse device with functional turntable of claim 8, wherein the control unit is further configurable for receiving the switching signal triggered by a switching of the pointing device, or receives the switching signal generated by operation of a computer system electrically connected with the pointing device.

12. The mouse device with functional turntable of claim 7, wherein the functional turntable is a mechanical-type turntable.

13. The mouse device with functional turntable of claim 7, wherein the functional turntable is an optical-type turntable.

14. The mouse device with functional turntable of claim 7, wherein the functional turntable is a touch-type turntable.

* * * * *